UNITED STATES PATENT OFFICE.

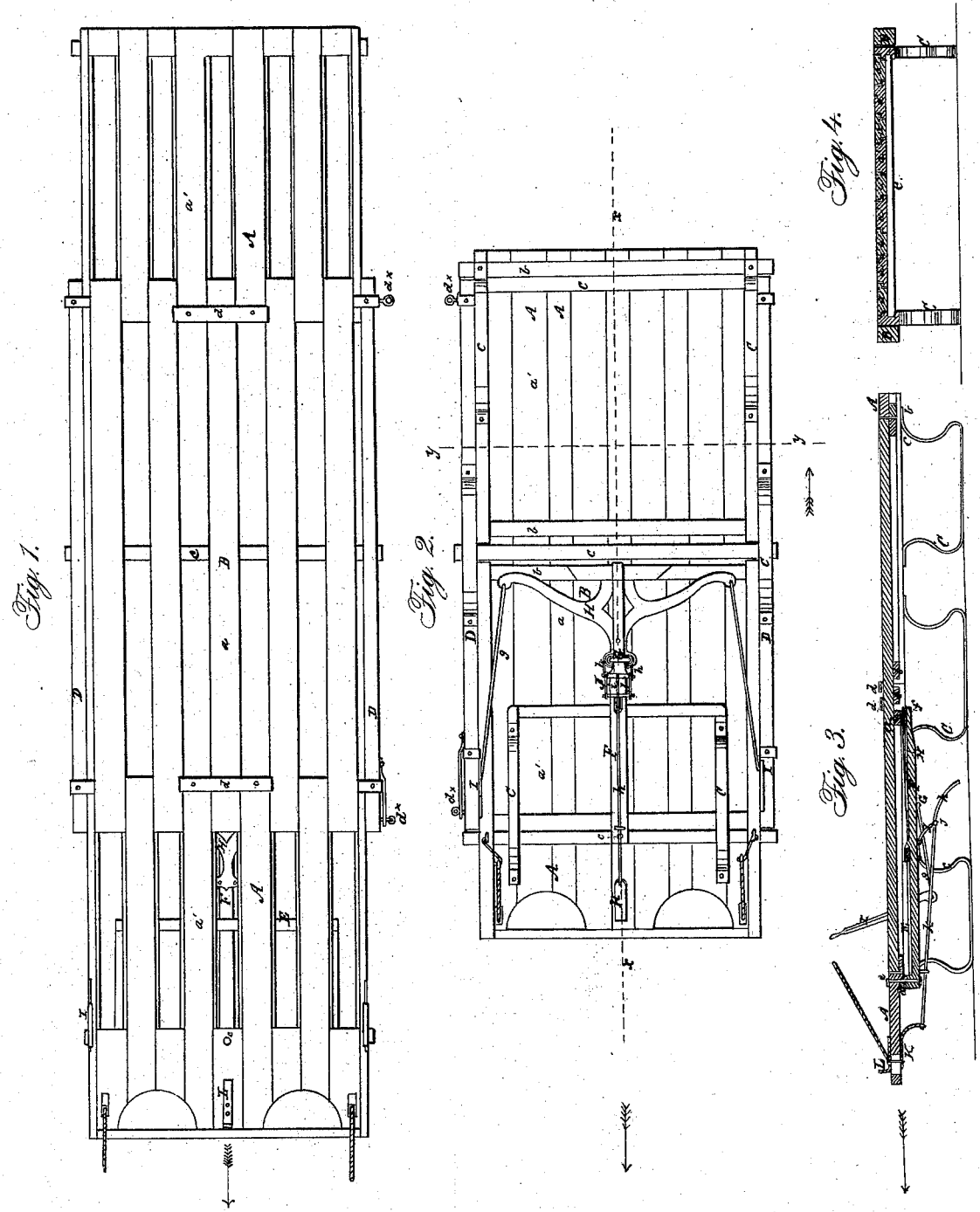

DAVID G. HUSSEY, OF NANTUCKET, MASSACHUSETTS.

IMPROVEMENT IN BOYS' SLEDS.

Specification forming part of Letters Patent No. 48,178, dated June 13, 1865.

*To all whom it may concern:*

Be it known that I, D. G. HUSSEY, of Nantucket, in the county of Nantucket, and State of Massachusetts, have invented a new and useful Improvement in Boys' Sleds; and I do hereby declare that the following is a full, clear, and exact description thereof, which will enable others skilled in the art to make and use the same, reference being had to the accompanying drawings, forming part of this specification, in which—

Figure 1 is a plan or top view of my invention in a distended state; Fig. 2, an inverted plan of the same in a closed or contracted state; Fig. 3, a longitudinal vertical section of Fig. 2, taken in the line $x\,x$; Fig. 4, a transverse vertical section of Fig. 2 taken in the line $y\,y$.

Similar letters of reference indicate like parts.

This invention relates to a new and improved sled for children; and it consists in constructing the sled in such a manner that it may be extended or enlarged, as may be desired, in order to hold a greater or less number of boys or children; and it also consists in an improved brake for checking the speed or stopping the sled when necessary; and, further, in an improved guiding or steering apparatus, all of which are herein fully shown and described.

The top of the sled is composed of three parts, A B A'. These parts are constructed, respectively, of a series of parallel slats, $a\,a'$, so arranged or disposed at a suitable distance apart that the slats $a'$ of the parts A A' will slide between the slats $a$ of the part B, the slats of the latter part being rabbeted at their under sides at each edge to fit in rabbets made in the upper sides of the slats of the parts A A', as shown clearly in Fig. 4. The slats $a'$ of the parts A A' are connected near their ends by cross-ties $b$, the slats $a$ of the part B being connected by cross-ties $c$ near their ends, and by one near their center, and the inner ends of the two central slats, $a'$, of the parts A A, have a sheet-metal plate, $d$, secured to their upper surfaces, said plates resting or bearing on the central slat $a$ of the part B. By this arrangement it will be seen that the top of the sled may be lengthened or shortened, as desired, as said parts may be drawn in and out similar to an extension-table.

Each part A B A' is supplied with a pair of runners, C, so that each part will have a support. These runners may be of metal or wood. The former material would probably be preferable.

The part B of the top of the sled has a side bar, D, at each side of it, through which pins $d^{\times}$ pass into the sides of the parts A A' and hold the parts at a greater or less degree of extension, as may be required, holes being made in the sides of A A' to receive the pins $d^{\times}$.

The runners C C of the front part, A, of the sled are not attached directly to said part, but are attached to a frame, E, of rectangular form, the front part of which is secured to the front cross-tie, $b$, by a pivot-bolt, $e$. (See Figs. 2 and 3.) This frame E has a bar, F, attached centrally and longitudinally to it, said bar extending considerably to the rear of E and passing through a loop, G, at the center of a lever, H, which has its fulcrum at $f$. The ends of the lever H are connected by wires or cords $g$ to levers I I, one at each side of the sled.

It will be seen by actuating the levers I the lever H and frame E will be turned, and consequently the runners which are attached to it, and the sled guided either to the right or left, as may be desired. I do not confine myself to this precise arrangement for actuating lever H, for other means than the levers I and wires or cords $g$ might be employed for the purpose. The levers I, however, would probably be preferable for girls, who invariably sit upon the sled, while boys, who frequently lie upon the sled, prefer steering or guiding the same, when in that position, with the feet, and means might be readily applied to lever H to admit of that result.

J represents the brake, which is composed of two wire teeth, $h\,h$, bent or coiled around a rod, $i$, attached to bar F, to give them a certain degree of spring or elasticity. These teeth $h\,h$ are connected by a cross-bar, $j$, which has a wire or cord, $k$, attached to it, said wire or cord extending forward and secured to a slide, K, which is attached to a foot-piece, L, at the upper side of the front part of the sled. By shoving the foot-piece L forward with the foot the teeth $h\,h$ will be drawn down by the wire or cord $k$, and made to penetrate the snow or earth and check the motion of the sled or entirely stop the same, if required. On renewing the pressure from the foot-piece L the spring of the teeth *h h* will cause them to rise free free from the ground.

I claim as new and desire to secure by Letters Patent—

1. The constructing or forming of the sled of a plurality of parts, attached respectively to the separate frame-pieces *a* and *a'*, alternately arranged in one plane, as represented in the drawings, so as to constitute a level floor or bed, and in such a manner that said parts may be extended in a greater or less degree, to increase the capacity of the sled, as may be required.

2. The combination of the pivoted steering-frame E, mounted on a pair of runners C C, and the levers F and H, constructed, arranged, and operating as described, in connection with levers I or equivalent means, for actuating the lever H.

3. The combination of the sliding foot-piece L K, rod *k*, and elastic brake-teeth *h h*, all constructed, arranged, and operating substantially as and for the purpose set forth.

DAVID G. HUSSEY.

Witnesses:
ALLEN SMITH,
CHAS. H. BAILEY.